UNITED STATES PATENT OFFICE.

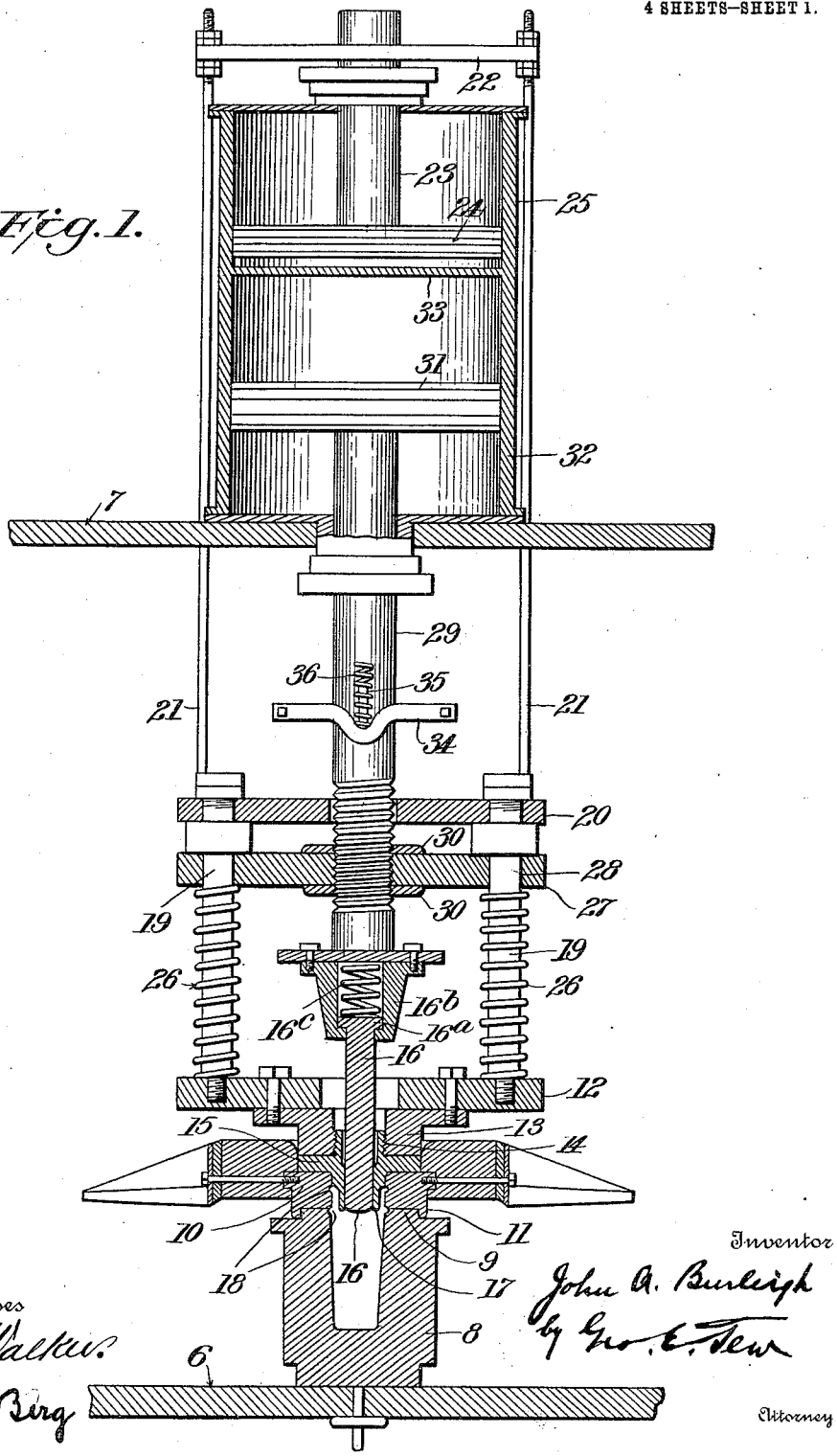

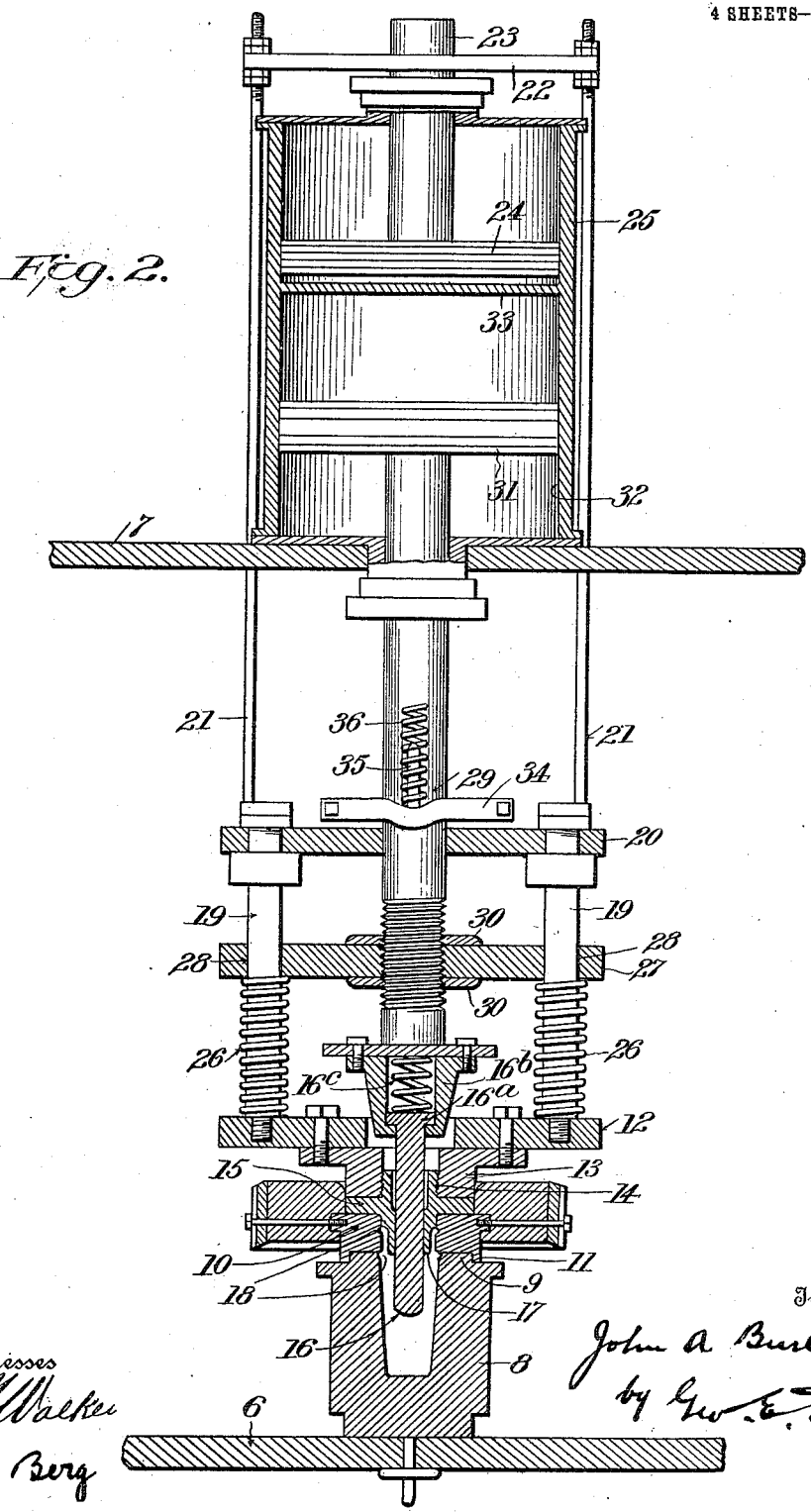

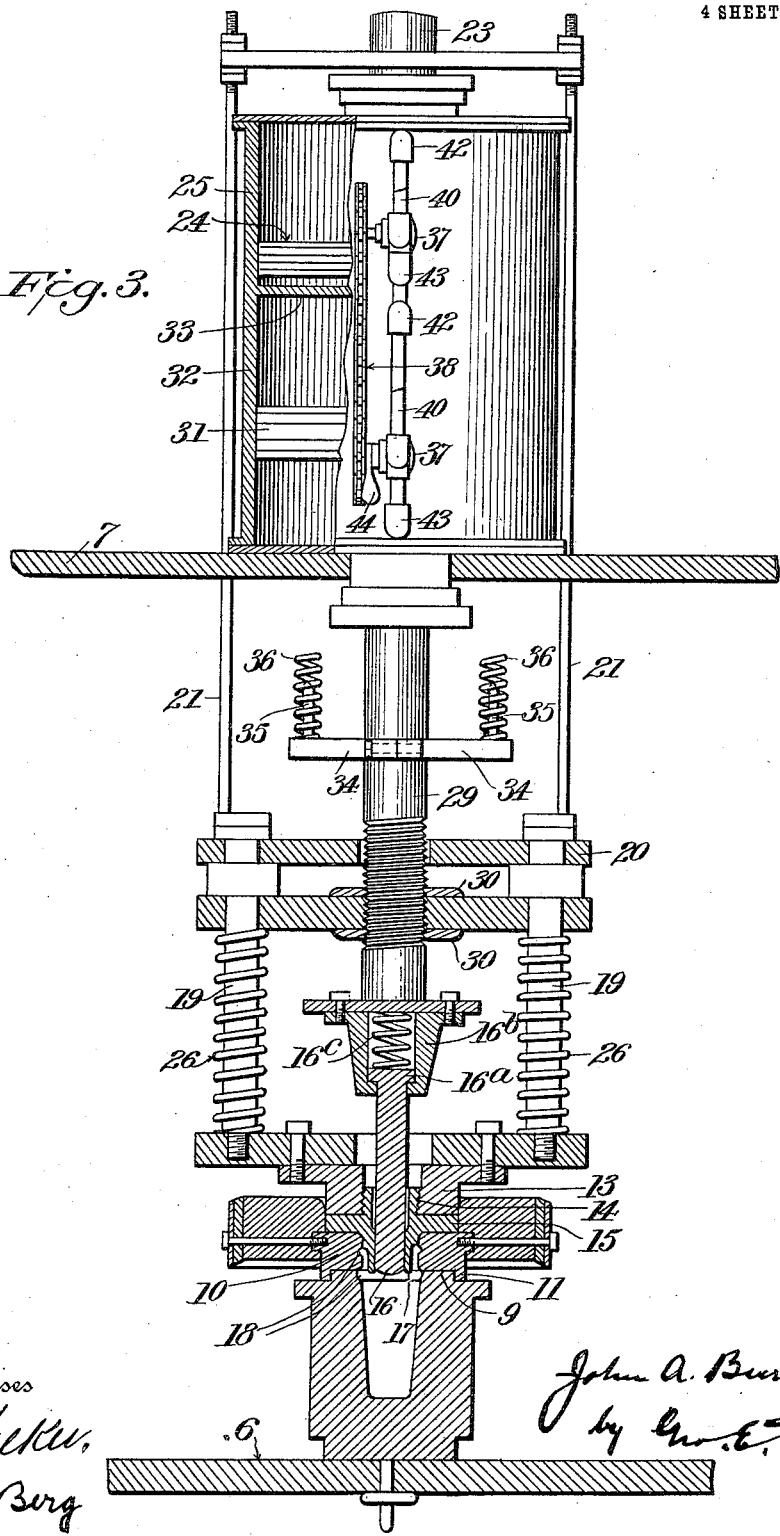

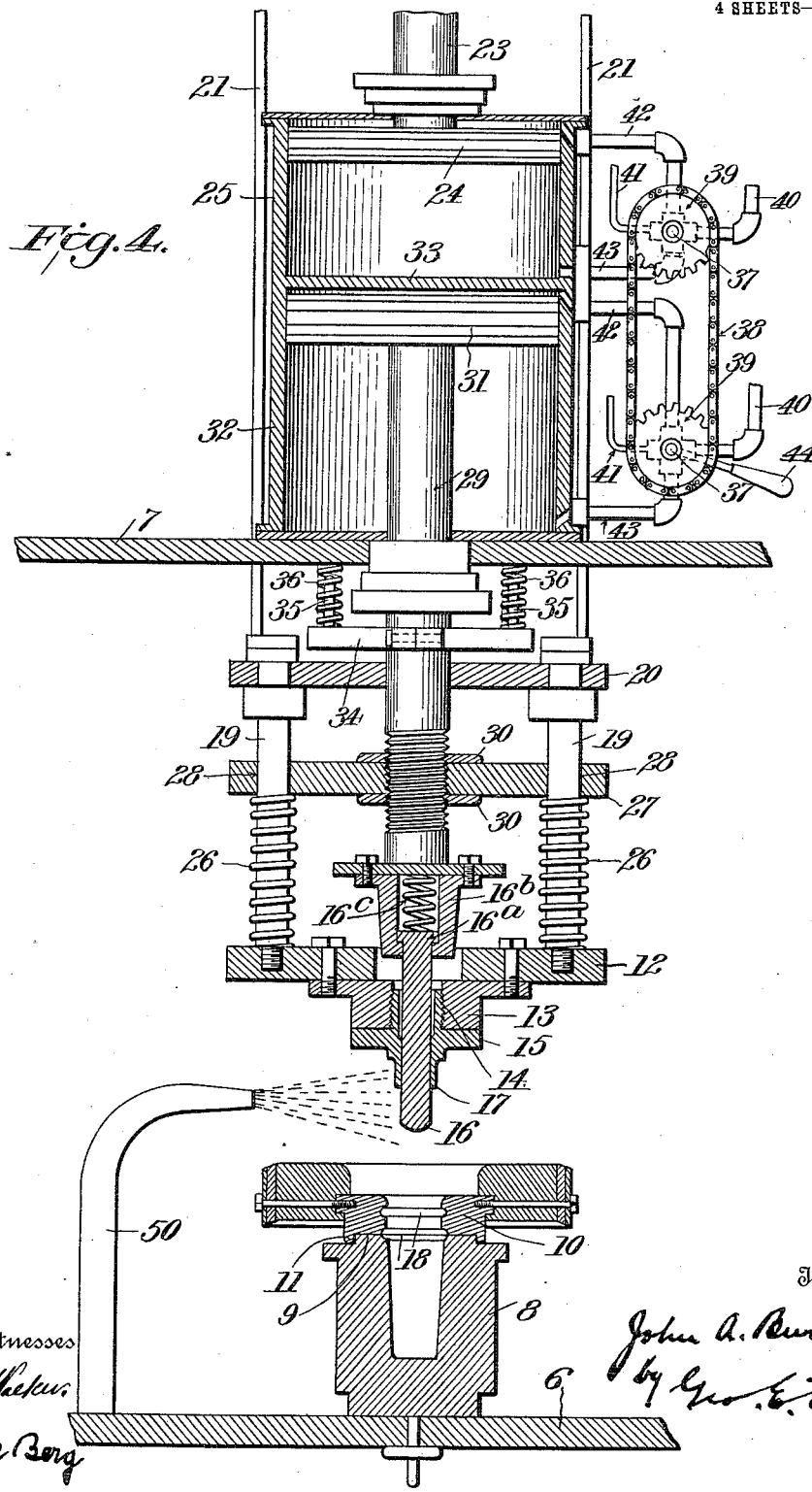

JOHN A. BURLEIGH, OF OLEAN, NEW YORK.

GLASS-BOTTLE MACHINE.

998,673.    Specification of Letters Patent.    Patented July 25, 1911.

Application filed August 2, 1910. Serial No. 575,139.

*To all whom it may concern:*

Be it known that I, JOHN A. BURLEIGH, a citizen of the United States, residing at Olean, in the county of Cattaraugus and State of New York, have invented certain new and useful Improvements in Glass-Bottle Machines, of which the following is a specification.

This invention relates to glass molding machines, and especially to that class of such machines employing a mold and a reciprocating plunger which enters the mold and presses the glass to form the blank for the bottle, jar or other article to be produced.

The object of the present invention is to provide improved means for remedying a defect existing in some machines, which is, that the bottle or jar neck is not smooth, but has a fin or mold mark caused by the molten glass entering the joints between the parts of the neck ring and other parts used to form the bottle neck.

A further object of the invention is to provide improved means for holding the internal neck ring or former in close contact with the external neck ring, so that the pressure created when the plunger is depressed will not lift or dislodge said neck ring, which ring also has a one piece sleeve producing a smooth inner surface in the neck of the bottle.

A further object of the invention is to provide improved means for operating the plunger and its associated parts, and for extending the plunger into position, during the time it is out of the mold, to receive a blast of air for the purpose of cooling said plunger.

A further object of the invention is to provide a yielding plunger to relieve strain on the neck mold and neck of the bottle incident to possible excess glass in the charge.

With these and other objects in view the invention is hereinafter described and is illustrated in the accompanying drawings, in which—

Figure 1 is a vertical section of the machine, with the parts in what I term the first position, as the plunger is about to enter the mold. Fig. 2 is a similar view in second position, with the plunger advanced into the mold. Fig. 3 is a similar view with the parts in third position, that is, withdrawn from the mold. Fig. 4 is a similar view with the parts in fourth position, the plunger being advanced to receive the air blast, for cooling purposes.

Referring specifically to the drawings, 6 indicates the table of the machine and 7 the top plate thereof. These parts will be supported in any suitable manner, and no description of the supports is believed to be necessary, as the construction thereof is unimportant. The table 6 supports the body 8 of the mold in which the blank is formed. This has a frame or projecting shoulder 9 at the top. An outer neck ring 10 fits on top of the mold. This is made in two parts and will be locked and held in position by known devices. It has a bottom flange 11 which fits around the shoulder 9.

Above the mold is a circular plate 12 to the underside of which is bolted a threaded socket ring 13 into which is screwed a nipple 14 on the top ring 15, through which the plunger 16 works at a close fit. This top ring has a depending sleeve 17 which fits the plunger closely along the whole length of said sleeve. The ring and sleeve are made in one piece, and when the ring is advanced the sleeve projects into the ring 10 and forms the inside of the neck of the bottle or other article. Inasmuch as this sleeve has no joint the inner surface of the neck of the article produced thereby will be smooth and without fins or irregularities, said neck being formed between said sleeve on the inside and the ring 10 on the outside. Lips on the outside of the neck will be formed by grooves 18, which may have the form of a thread for producing threaded necks.

The plate 12 is carried at the lower ends of rods 19, which are fastened at the upper ends to an upper plate 20 carried at the lower ends of rods 21 which are connected at their upper ends to a cross head 22 mounted at the top of a piston rod 23, with a piston 24 which moves in an upper cylinder 25.

Springs 26 are coiled around the rods 19, between the lower plate 12 and an intermediate plate 27 which has openings at 28 through which the rods 19 work freely. The plate 27 is adjustably mounted on a piston rod 29, between nuts 30 on a threaded part of said rod, and by manipulation of the nuts the position of the plate 27 may be varied. The piston rod 29 works freely through an opening in the plate 20, and it is attached at its upper end to a piston 31 which operates in a cylinder 32. The cylinders 25 and 32 may be conveniently formed integrally, one above the other, with a partition head 33 therebetween, the whole mounted on the top 7. Mounted upon the piston rod 29, between the upper plate 20 and the top 7 is a cross head 34 with upwardly projecting pins 35 supporting upright coiled springs 36, which are stiffer than the springs 26, and which are arranged to strike the underside of the table 7 when the piston is raised to nearly the end of its upward stroke.

The movement of the pistons 24 and 31 in the respective cylinders is controlled by a pair of four way valves 37, which are more particularly described and illustrated in my pending application No. 575,138 filed August 2d, 1910, and the plugs of said valves are connected together for simultaneous operation by a chain belt 38 which extends around the sprocket wheels 39 on the stems of the valves. An inlet pipe 40 for air under pressure leads to each valve, which also has an exhaust outlet 41 and two pipes 42 and 43 leading respectively to the top and bottom of the corresponding cylinders. The lower valve stem also has a handle 44 for manipulation of the valves, which are so constructed that when the valves are turned one way air will be admitted above the pistons and exhausted from below the same, and vice versa, there being a slight lag, however, between the lower and the upper pistons, incident to the special arrangement of the valve ports and to the slackness of the chain and the slip of the sprocket wheels therein when the valves are reversed, so that the lower piston operates on the down stroke somewhat behind the upper piston, as will appear from Figs. 1 and 2, and somewhat ahead of the upper piston on the up stroke, but the lower cylinder 32 is longer than the upper cylinder, so that the lower piston has a somewhat longer travel than the upper piston.

The plunger 16 has a head 16ª and is slidable up and down to a limited extent in a shouldered cuff 16ᵇ fastened to the lower end of the piston rod 29, being normally advanced by a coiled spring 16ᶜ confined in the cuff behind the head of the plunger.

In the operation of the machine, assuming that the mold has been charged with the necessary quantity of glass to form the bottle or other article, air is admitted into the top of the cylinders 25 and 32, driving the pistons down. The upper piston, by means of the connecting rods 21, forces the top ring 15 against the outer neck mold 10, and holds the same there with sufficient pressure to prevent any lift of said ring, as shown in Fig. 1. The plunger 16 in the meantime moves down with the top ring and finally, by continued travel of the piston 31, incident to the greater length of the cylinder 32, is forced down into the mold to press the charge, as shown in Fig. 2. The valves are then reversed, and the first action is to lift the plunger 16 in consequence of the movement of the piston 31, which moves in advance as above explained, and after the plunger withdraws from the glass, the top ring 15 then lifts from the mold, to the position shown in Fig. 3, said parts being thus entirely withdrawn from the mold, from which the blank may then be removed by opening the ring 10. When the position shown in Fig. 3 is reached, the springs 36 come in contact with the underside of the top or frame 7, and continued movement of the upper piston 24 retracts the ring 15, the springs 26 compressing between the plates 27 and 12 causing the lower end of the plunger 16 to project beyond or below the ring 15, in which position it receives a blast of cold air from the nozzle 50 and is cooled preliminary to the next operation, which occurs when the valves are turned back and air is admitted above the pistons and exhausted from below the same, the springs 26 then acting to advance the ring 15 along the plunger to the end thereof, both then descending to the position shown in Fig. 1 after which the operation above described is repeated.

The variation in speed or rapidity of travel of the respective pistons is controlled by adjustment of supplemental valves associated with the main valves 39 and controlling the inlet flow, in a manner more fully described in my other application above referred to.

It will be noted that the upper plate 15 during the molding operation is pressed and held in close contact with the neck section 10, in consequence of the fluid pressure of the piston 24, and said top ring 15 also holds the ring 10 tightly against the top of the mold body. The plunger 16 is the same diameter throughout, and fits the sleeve 17 closely, so that glass will not enter therebetween when the plunger is operated. After the neck is formed by the means above described the blank is removed for further operation to produce the finished article. The separate cylinder control of the plunger and top ring permits the necessary variation in relative position of said parts to effect the desirable pressing and cooling operation, since said parts are independently controlled to a certain extent, with results decidedly superior to constructions in which both of said parts are operated by means of a single cylinder.

In consequence of the spring 16ᶜ, located behind the plunger, said plunger will yield to a certain extent, which is decidedly advantageous. If the plunger is rigidly attached to the piston rod, as heretofore, and too much molten glass is charged into the blank mold the strain incident to the descent of the plunger tends to excessive compression within the neck ring, resulting frequently in an imperfect neck or lifting of the ring. By the provision of the spring 16 this defect is avoided, and if there is too much glass in the blank the plunger will yield to accommodate the same without preventing the descent of the neck mold to the proper position and without the other objections incident to excessive pressure at the neck. In other words the plunger accommodates itself to the charge, which is important inasmuch as the amount of the charge, in such machines, depends on the skill of the workman and cannot be exactly uniform. Any strain upon the necks of bottles from undue pressure of the plunger is thus relieved and the strength and quality of the bottle neck is improved.

Having thus described the invention what I claim as new and desire to secure by Letters Patent is:—

1. In a machine for molding bottles or the like, the combination of a tubular neck former movable up and down, a plunger movable in the neck-former, separate means to respectively operate said neck-former and plunger, a yielding stop for the plunger at the end of its up stroke and a spring connection between the neck-former and plunger, permitting yielding movement of the neck former relative to the plunger at the end of the up stroke of the latter, whereby the plunger will be exposed below the neck former, for cooling purposes.

2. In a machine for molding bottles or the like, the combination of upper and lower cylinders and pistons therein, a neck former connected to one piston and movable therewith, a plunger working in the neck former and connected to the other piston for movement therewith, a stop for the plunger at the end of its up stroke and springs operatively connected between the plunger and the neck former and arranged for compression at the ends of both the up and down strokes, to permit relative movement of both the neck former and plunger at the ends of said strokes.

3. In a machine for molding bottles or the like, the combination of upper and lower cylinders and pistons therein a neck former connected to one piston and movable therewith, and a plunger working in the neck former and connected to the other piston for movement therewith, means independent of the piston to limit the upward movement of the plunger and the downward movement of the neck-former, and a spring connection between the plunger and the neck-former permitting relative yielding movement thereof at the ends of both the upward and downward movement of the plunger.

4. In a machine for molding bottles or the like, the combination of upper and lower cylinders and pistons therein, a frame having upper and lower spaced plates and operatively connected to the piston of the upper cylinder, a neck-former attached to the lower plate, a plunger carried by the piston rod of the lower cylinder and working in the neck former, an intermediate plate secured to the plunger and located between the said upper and lower plates, springs between the intermediate and lower plates, and a yielding stop for the upward movement of the plunger.

5. In a machine for molding bottles or the like, the combination of upper and lower cylinders, and pistons therein, connected valves controlling respectively the inlet of fluid pressure to and the exhaust from said cylinders, a plunger connected to one piston, and a neck former, in which the plunger works, connected to the other piston, and yielding connecting devices between the plunger and neck-former, permitting movement of one relative to the other.

6. In a machine for molding bottles or the like, the combination of upper and lower cylinders, a piston in the upper cylinder with its rod working through the top of said cylinder, a piston in the lower cylinder, with its rod working through the bottom of said cylinder, a frame located under the lower cylinder and connected to the piston rod of the upper cylinder, a neck former carried by said frame at the lower end thereof, a plunger working in said neck former and connected to the lower end of the piston rod of the lower cylinder, a strike plate with springs carried thereon attached to the last-mentioned piston rod and arranged to stop the lift thereof, and springs arranged between the frame and the said last mentioned piston rod and arranged for compression when the said lift is stopped, to permit projecting of the plunger beyond the neck-former, for the purpose stated.

In testimony whereof, I affix my signature in presence of two witnesses.

JOHN A. BURLEIGH.

Witnesses:
J. L. CLYDE,
F. E. COLLINS.